United States Patent [19]

Polster et al.

[11] Patent Number: 4,897,755
[45] Date of Patent: Jan. 30, 1990

[54] APPARATUS AND METHOD FOR RELAY CONTROL

[75] Inventors: Louis S. Polster, 1017 E. Fairmount Rd., Burbank, Calif. 91501; Ronald R. Flinders, Sunland, Calif.

[73] Assignee: Louis S. Polster, Burbank, Calif.

[21] Appl. No.: 212,437

[22] Filed: Jun. 28, 1988

[51] Int. Cl.⁴ .............................................. H02H 3/00
[52] U.S. Cl. ........................................ 361/2; 361/160; 361/173; 307/117
[58] Field of Search ......................... 361/2, 5, 6, 8, 13, 361/160, 170, 173, 174; 307/117

[56] References Cited

U.S. PATENT DOCUMENTS 4,011,499 3/1977 Betsill et al. ..................... 361/2 X
4,051,394 9/1977 Ticden ............................ 361/173 X Primary Examiner—Derek S. Jennings
Attorney, Agent, or Firm—Allan M. Shapiro

[57] ABSTRACT

Where there is a relay controlling an AC power circuit to a load, the apparatus of this disclosure includes a sensor for observing arc at the relay contacts and a control circuit which controls the time of subsequent actuation or deactuation of the relay with respect to the alternating current power circuit so as to eliminate relay contact arcing.

22 Claims, 3 Drawing Sheets

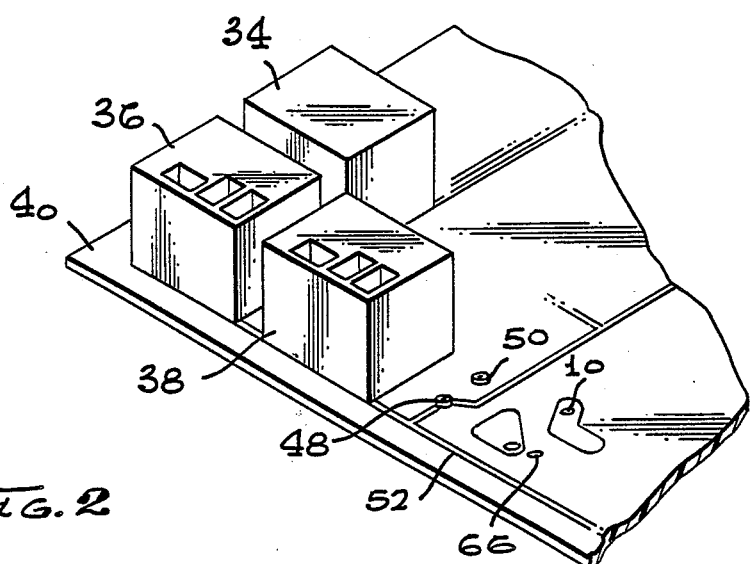
FIG.1
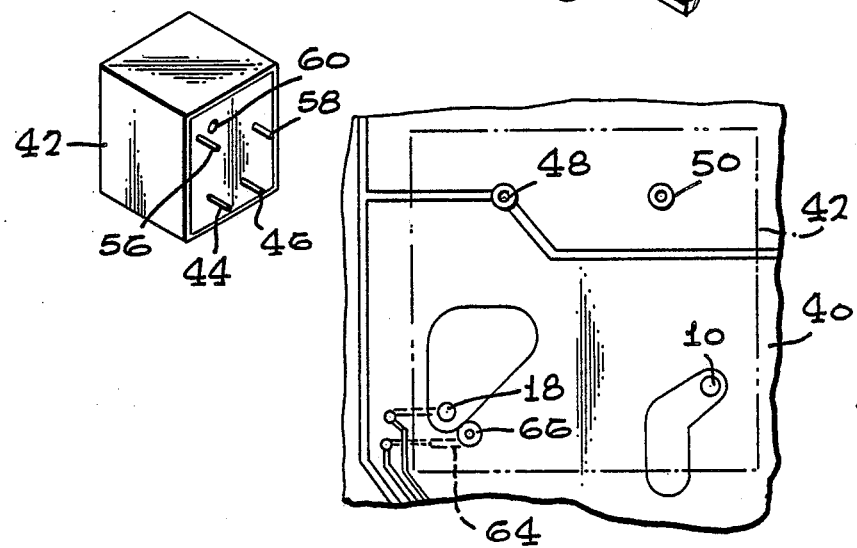
FIG.2
FIG.3
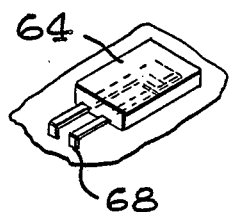
FIG.4
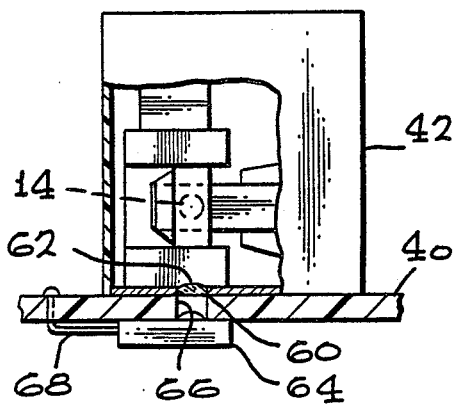
FIG.5
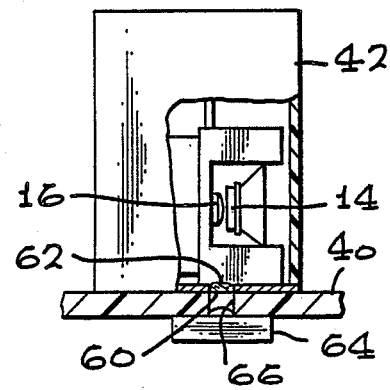
FIG.6

APPARATUS AND METHOD FOR RELAY CONTROL

FIELD OF THE INVENTION

This invention is directed to the control of a relay connected to a load, by controlling the operating or dropout point of the relay so that it opens or closes at a zero current point in the AC load circuit to eliminate arcing at the relay contacts.

BACKGROUND OF THE INVENTION

Current is delivered to an alternating current load through the contacts of a relay. When the load is to be switched off or on, the relay is actuated or deactuated. When the relay contacts open while current is flowing therethrough, an arc is drawn until the next zero current point, and this arc burns the relay contacts. Similar arcing occurs if contact closure is made at a non-zero current point. It is this arc burning of the relay contacts which reduces relay life. Accordingly, to achieve greater relay life, it is desirable to reduce or eliminate arcing upon the opening or closing of the relay contacts.

SUMMARY OF THE INVENTION

In order to aid in the understanding of this invention, it can be stated in essentially summary form that it is directed to an apparatus and method for relay control which achieves minimized relay arcing by operating the relay so as to open or close its contacts at the zero current point in the AC load circuit. The method and apparatus include a device for observing and a means for measuring the time of arcing and a control circuit for receiving the relay open command signal and sending an operating command so that the relay opens or closes its contacts at or near the zero current point of the AC load circuit.

It is, accordingly, an object and advantage of this invention to provide an apparatus and method for controlling a relay which supplies an alternating current load which maximizes relay life by minimizing arcing at the relay contacts when switching the load off or on.

It is another object and advantage of this invention to provide an apparatus which has a radiation sensor positioned to receive radiation emitted from a relay contact arc and has a control circuit connected to the radiation sensor so as to shift the relay operating command to achieve relay contacts opening or closing at or near zero current crossing.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawing.

BRIEF DESCRIPTION OF THE DRAWINGS

FIG. 1 is an isometric view of an example of a relay installation, employing the method and apparatus for relay contacts or control in accordance with this invention.

FIG. 2 is an isometric view of a plug-in relay for use with the method and apparatus of this invention.

FIG. 3 shows a printed wiring board in which the relay of FIG. 2 is plugged in, including part of the apparatus of this invention.

FIG. 4 is an isometric view of the sensor secured to the printed wiring board of FIG. 3.

FIG. 5 is an enlarged side-elevational view of the relay on the printed wiring board with parts broken away.

FIG. 6 is an end-elevational view thereof with parts broken away.

DESCRIPTION OF THE PREFERRED EMBODIMENT

Figure 7:
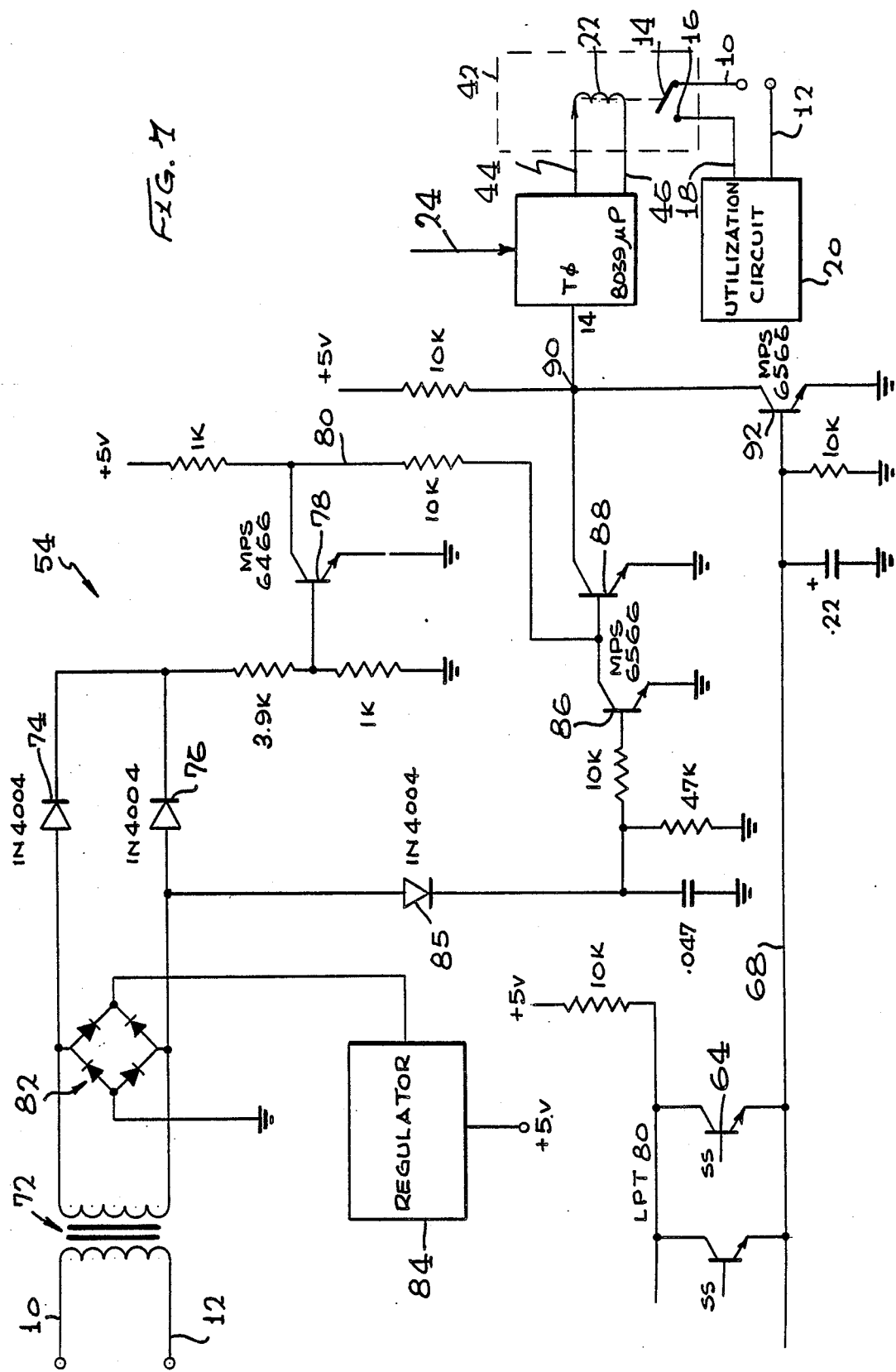
FIG. 7 is an electrical schematic block diagram showing an apparatus embodying this invention.

The system for which the apparatus and method are intended and for which they improve operating life comprises an AC power source represented by lines 10 and 12 in FIG. 7. Line 10 is connected to moving contact 14 which is connected to contact 16 upon closing of moving contact 14. The fixed contact 16 is connected by line 18 to a load 20. The load 20 may be any type of utilization circuit, including circuits having inductive and/or capacitive elements therein although, for convenience, the present invention will be described in connection with an inductive load. The utilization circuit 20 broadly represents any alternating current load. The utilization circuit is connected back to AC line 12 either directly, as indicated, or through additional contacts acting in parallel with the contacts 14 and 16.

As is conventional in relays, a solenoid coil 22 has its plunger mechanically connected to the moving contact 14 so that electrical actuation of the coil causes actuation of the moving contact. For convenience of description of the conditions for and operation of the present invention, the relay illustrated in FIG. 7 will be considered as "normally closed" in the sense that, when relay coil 22 is not energized, the contact 14 is closed as by a conventional spring (not shown). The relay can be constructed in the opposite manner so that, with deactuation of the coil, the contact will be opened by the spring and, in such a case, is a "normally open" contact. Command line 24 carries a signal to energize the solenoid and actuate the relay. In conventional systems, the command line 24 may be directly connected to relay coil 22 so that, when a signal is present, the coil is energized and the contacts are opened.

Figure 8:
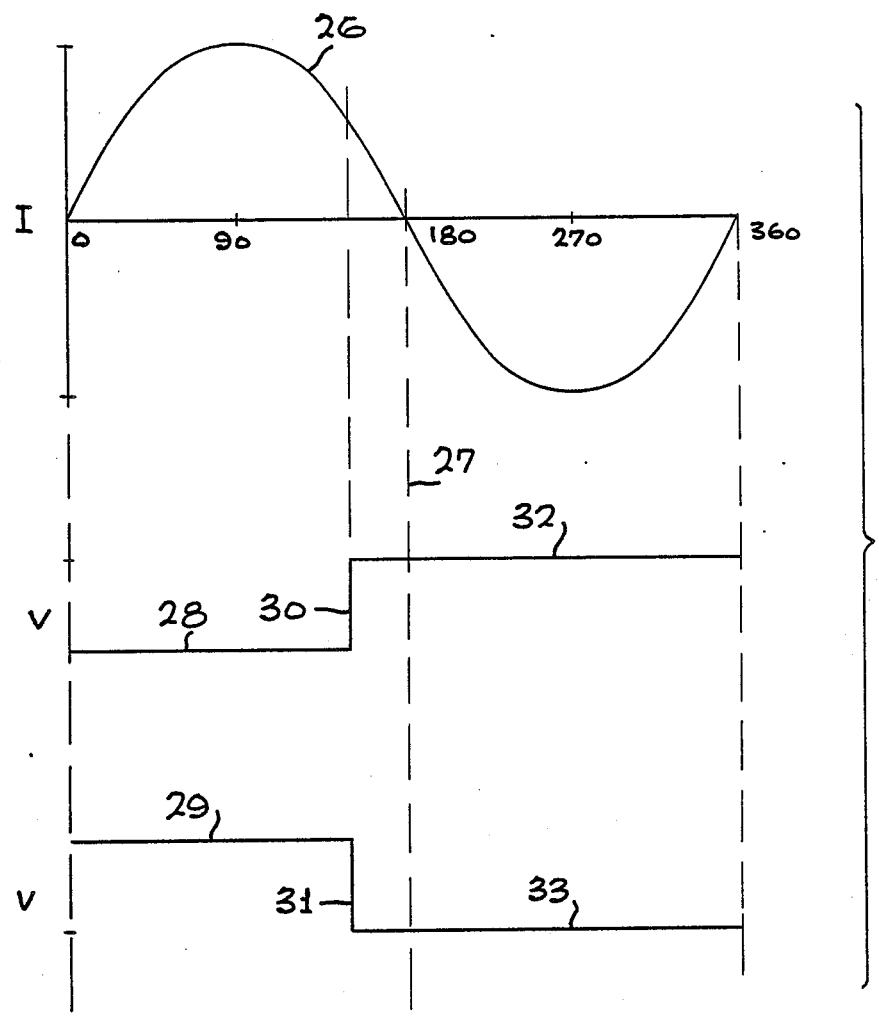
FIG. 8 is a wave form diagram showing the current versus time and showing the relay command signal versus the same time base.

FIG. 8 represents by its curve 26 the current supplied in the AC lines 10 and 12. The current line 26 is optimally a sine wave and is shown in the single cycle in FIG. 8, with a positive current pulse from 0 to 180 degrees and a negative current pulse from 180 to 360 degrees. A zero crossing of the current is achieved at 0, 180, and 360 degrees. The current curve is shown as an idealized sine wave in FIG. 8 for convenience of illustration. The middle part of FIG. 8 represents the voltage to relay coil 22 which, in this example, is of the "normally closed" type so that it requires actuation voltage to the relay to open the contacts. In its low state represented by line 28, the relay is closed. At the time represented by rising line 30, the voltage to relay 22 goes to the high state represented by line 32 and, after a very short period of time of less than a half cycle, the relay contacts are opened. As is wellknown, when relay contacts are opened with current flowing therethrough, an arc is drawn, and this arc burns the relay contacts and reduces the life of the relay. In conventional circuits, there is no control over the actuation timing of the relay with respect to the current wave therethrough. Thus, the time 30 may occur at any point in the cycle between 0 and 360 degrees, and the chance that it will occur at one of the zero current crossings, such as indicated by line 27, is small. For this reason, the life of a conventional relay is greatly reduced.

FIG. 1 shows relays 34, 36 and 38 plugged into printed wiring board 40. The printed wiring board is a dielectric substrate carrying on one or both surfaces signal and load wiring for the relays plugged therein. Relay 42 is the same as relays 34, 36 and 38 and is shown in FIG. 2 in a position where it is unplugged from the printed wiring board and, in FIGS. 3, 5 and 6, in a position where it is plugged into the printed wiring board. The relays 34, 36, 38 and 42 are examples of commercially available relays which can be employed in connection with the method and apparatus of this invention. The relay 42 contains the contacts 14 and 16 and coil 22. Relay pins 44 and 46 are connected to the coil and insert into board pin sockets 48 and 50, respectively. As is seen in FIGS. 1 and 3, pin socket 48 is connected to bus 52, which may connect to similar pin sockets with respect to other relays. The bus 52 is connected to control circuit 54 of this invention, generally indicated in FIG. 7. The socket 50 is also connected to the control circuit 54 so that the control circuit controls the energization of pins 44 and 46 and, consequently, the energization of relay coil 22. Each relay on the board is connected to be operated by the control circuit. The control circuit 54 is the control circuit for relay 42 and any other relays in its group. The pin 56 shown in FIG. 2 is the lead 18 in FIG. 7, which is connected to the fixed contact 16 and is connected to the utilization circuit. In the present instance, relay pin 56 is connected to the stationary contact of the relay and is received in socket 18 in FIG. 3, which is part of the line to the utilization circuit. Relay pin 58 is connected to the moving contact of the relay and plugs into the socket 10 in FIG. 3 which forms part of the alternating current line 10 seen in FIG. 7. Relay 42 is thus a plug-in relay unit which plugs into corresponding sockets in the printed wiring board to receive actuation signals from the control lines in the printed wiring board and to control the flow of power in the power lines in the printed wiring board.

Relay 42 and each of the other relays controlled in accordance with the apparatus and method of this invention has its contacts visible. In the relay 42, this is achieved by the provision of a window opening 60 in line with the relay contacts, as seen in FIGS. 5 and 6. The window opening may contain a convex lens 62 to collimate the optical emissions of arcing at the contacts. Positioned to receive the visible arcing emissions is a light-sensing semiconductor device 64. The light-sensing device is conveniently positioned on the lower side of board 40. The board is provided with an opening 66 in alignment with the opening 60. As seen in FIG. 7, the light-sensing device 64 sends a signal through line 68 to the control circuit with its signal corresponding to the arcing of the contacts 14 and 16. While a visible signal is described, arc radiation in other frequencies can be detected and employed as arc sensors.

It should be noted that, with a sensor (such as light-sensing device 64 for example) at each relay, each relay can be controlling a load having different characteristics from the other loads, such as inductive or capacitive characteristics, and each relay is controlled for "no arc" at its load contacts.

Referring to FIG. 7, it is seen that the AC lines 10 and 12 also feed signal transformer 72 which has its secondary connected through a pair of IN 4004 diodes 74 and 76. Both diodes are connected to the gate of MPS 6566 transistor 78. The collector line 80 of the transistor has a high pulse at each voltage zero crossing of the supply lines 10 and 12. Connected between the signal transformer at the lines is full-wave rectifier bridge 82 which supplies power to regulator 84 which supplies voltage to the circuit.

The input to rectifier 76 is also connected to the input of IN 4004 diode 85, which has its output connected through a network to the base of MPS 6566 transistor 86. The collector of transistor 86 and the signal line 80 are both connected to the base of MPS 6566 transistor 88. The function of this circuit is to cancel alternate pulses in line 88 and invert. The output signal in line 90 is high with a low pulse at alternate voltage zero crossings.

The sensing device 64 shown in FIG. 7 is a light-sensing LPT 80 photo-transistor, and as previously indicated, a plurality of such photo-transistors may be respectively observing a plurality of relay contacts for arcing. Several are shown, but the control circuit may control only a single relay and, in such a case, only one photo-transistor is required. On the other hand, while it is most convenient to observe the arc by means of its visible light output, other types of sensors may be alternatively employed, so long as they indicate the timing and duration of the arc. Line 68 is connected to the gate of MPS 6566 transistor 92, and the collector of this transistor is also connected to signal line 90. The result is that the signal in line 90 is held low for the duration of any arc observed by the sensor 64.

Line 90 is connected to terminal 14 of 8039 microprocessor. Microprocessor 94 is programmed as a logic device. Whenever it is instructed to open a relay contact by a command signal in command line 24, the logic device actuates relay opening at a subsequent zero crossing indicated in line 90. If an arc is observed by the sensor 64, or companion sensor, the logic device measures the duration of the arc and places the duration information in memory for that relay. Each subsequent relay opening command causes the logic device to look to the memory for that relay and add the remembered time to the zero voltage crossing point signaled by line 90 before actuating the relay by an actuation signal in line 44. Thus, the relay 42 is caused to open its contact 14 at a zero current crossing 27 (FIG. 8) so that there is no opening arc. This results in long relay life.

Referring again to FIG. 8, the bottom waveform illustrates the voltage condition for drop-out operation of a "normally open" contacts relay, with the relay contacts closed at line 29, the voltage dropping at line 31, to the de-actuated relay voltage at line 33, and the contacts opening at zero current time line 27.

As a particular utilization circuit, a 16 ampere, 230 volt "Calrod" heater load is supplied through a suitable plug-in relay. Without the apparatus and method of this invention, the normally expected relay life is about 200,000 cycles. Since the contact burning rate is extremely small when the apparatus and method of this invention are employed, relay life under the same circumstances but with the inventive adjustment of the actuation point for no arcing, of about 5,000,000 cycles can be achieved without relay failure. The greater the current in the load circuit, the more arcing occurs with the consequence of more contact damage. The amount of arcing is a function of the load reactance. A purely resistive load would produce minimum relay contact damage, but even a "Calrod" heater load is sufficiently inductive to cause relay contact damage of the amount noted above. Thus, different relay life improvement can be seen with different loads.

In most relays, the pull-in or drop-out time changes slowly due to the amount of cycling required. Such is especially true in permanently connected equipment. For example, in the present case, the utilization circuitry 20 is considered to be the heater in a deep-fat fryer and the command signal in line 24 is a signal related to the deep-fat temperature so that the temperature of the deep fat can be carefully controlled. In other types of cooking or other utilizations, the command signal 24 may be a timing circuit which terminates power to the utilization circuit. In permanent or semipermanent installations, circuit and equipment parameters change only slowly, and thus the observation of the arc need not be automatic but may be periodically done by the cooker operator, the manager, or maintenance personnel. In such manually adjusted equipment, the observer would make a manual adjustment on the control circuit to adjust the point at which energization of coil 22 occurs as a function of the current curve 26 so that the contact 14 opens at zero arc. It must be observed that the energization in lines 44 and 46 does not occur at 0, 180, or 360 degrees on the current wave, but occurs sufficiently before so that the contacts actually open at the zero point. In such a case, the control circuit 54 would be one in which a command signal is received in line 24 signalling the desire for relay opening, followed by an analysis of the voltage curve, and when the voltage curve reaches a predetermined point on its cycle, relay coil 22 is energized so that the moving contact opens when the current curve is at one of its zero points. The manual adjustment would adjust the point on the voltage curve at which the solenoid energization occurs. The automatic case is the same, but the arc is seen by a detector and the adjustment is automatically achieved.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An apparatus for the control of
a relay having relay contacts, comprising:
a control circuit;
command signal connection means forming part of said control circuit for receiving a signal signalling the actuation of a relay;
energization connection means forming part of said control circuit for connection to a relay for opening or closing the contacts of the relay;
observation means for observing electric arcing occurring during opening or closing of the relay contacts;
adjustment means forming part of said control circuit for controlling the energization point of said energization connection means, said observation means being connected to said adjustment means for adjusting said adjustment means so that the relay contacts open or close during a substantially zero current through the relay contacts.

2. The apparatus of claim 1 further including
means connected to said control circuit for sensing the zero voltage crossing points for timing reference for said energization point.

3. The apparatus of claim 1 wherein said
means for observing comprises a light-sensing device positioned to receive optical arc signals and connected to said control circuit to signal the presence of arcing upon opening or closing of the relay contacts.

4. The apparatus of claim 3 wherein a relay
having a solenoid is connected so that its solenoid is energized by said control circuit, said relay having contacts observed by said light-sensing device.

5. The apparatus of claim 4 wherein said
relay has a housing and there is an opening in said housing in line with said contacts in said relay, said opening in said housing being in alignment between said contacts and said light-sensing device.

6. The apparatus of claim 5 wherein there is
a lens positioned between said contacts and said light-sensing device to collect optical emissions from relay contact arcing and direct them towards said light-sensing device.

7. The apparatus of claim 1 further including
a circuitboard and said circuitboard has sockets therein for the receipt thereon of a plug-in relay and said observation means is mounted on said circuitboard.

8. The apparatus of claim 7 wherein
a relay is plugged into said circuitboard, said relay having contacts, said relay contacts being positioned to be visually observable by said observation means.

9. An apparatus for relay control comprising:
a control circuit;
operating means connected to said control circuit for causing the opening of relay contacts in an AC line;
an arc sensor positioned with respect to the relay contacts to detect arcing emissions resulting from opening of the relay contacts when current is passing therethrough, said arc sensor being connected to said control circuit to signal arcing to said control circuit;
a zero voltage sensing circuit connected to the AC line and connected to said control circuit to provide a time reference for the AC line to said control circuit; and
command signal means connected to said control circuit to signal the opening of the relay contacts, said control circuit being connected so that when a relay opening command signal is received and said control circuit causes opening of said relay contact and an arc is detected, said control circuit is adjusted to cause relay operation to open the relay contacts at a different point on the current cycle on subsequent actuation so that, upon subsequent relay opening, the control circuit is adjusted so that the relay contacts open at a zero current point on the AC cycle and no arcing is detected.

10. The apparatus of claim 9 wherein a relay
having relay contacts is connected to said control circuit.

11. The apparatus of claim 10 wherein a utilization circuit is connected to said relay contacts, said utilization circuit being a cooking heater load and said command signal means connected to said control circuit being a cooking condition command signal.

12. The apparatus of claim 11 wherein said cooking heater load is an electric cooking heater load and said cooking condition command signal circuit is a signal corresponding to adequate cooking temperature so that there is need to disconnect said cooking heater load from the AC power supply.

13. The apparatus of claim 9 wherein there is a relay connected to said control circuit and said relay has contacts which are observed by said sensor, a housing at least partially around said relay contact, said housing having an opening therein between said contacts and said sensor so that arcing of said contacts can radiate to said sensor.

14. The apparatus of claim 13 wherein there is energy collection means in said opening in said housing, said energy collection means being for collecting energy radiated by contact arcing and for directing a portion of the arcing energy to said sensor.

15. The apparatus of claim 14 wherein there is a printed wiring board and said relay is mounted on said printed wiring board and said sensor is mounted on said printed wiring board in detection relationship to said relay.

16. The apparatus of claim 15 wherein a utilization circuit is connected to said relay contacts, said utilization circuit being a cooking heater load and said command signal means connected to said control circuit being a cooking condition command signal.

17. The apparatus of claim 16 wherein said cooking circuit is an electric cooking heater load and said cooking condition command signal circuit is a signal corresponding to adequate cooking temperature so that there is need to disconnect said cooking heater load from the AC power supply.

18. The method of controlling a relay which has contacts for connection into an AC load line and which has an actuation device for controlling the contacts, comprising the steps of:
detecting the alternating voltage state at the point along the AC cycle at which the relay contacts are opened;
observing radiation at the opening of the contacts and when there is radiation;
adjusting the time of relay opening with respect to the AC wave to a different point on the AC wave so that the relay arcing radiation is minimized to enhance contact life.

19. The method of claim 18 wherein the adjusting step is automatically achieved in a control circuit which receives a radiation signal, an AC wave signal and a relay opening command signal.

20. The method of claim 18 wherein the radiation observation is achieved by visual viewing and the adjustment of the relay actuation signal with respect to the AC signal is achieved manually.

21. The method of claim 20 including the previous step of, connecting the relay to energize a cooking heater load and connecting the command signal to a cooking signal source.

22. The method of claim 19 wherein the relay arc radiation detector is an electronic detector and the signal therefrom is connected to automatically adjust the relay operating point with respect to the AC current wave.

* * * * *